United States Patent [19]

Levien

[11] Patent Number: 5,365,602
[45] Date of Patent: Nov. 15, 1994

[54] INTEGRATED HALF-TONE SCREENING AND ENLARGING USING AN ENLARGEMENT MAPPING PATTERN HAVING LINKED, UNIQUE PATTERN SEGMENTS

[76] Inventor: Raphael L. Levien, P.O. Box 31, McDowell, Va. 24458

[21] Appl. No.: 89,893

[22] Filed: Jul. 9, 1993

Related U.S. Application Data

[63] Continuation of Ser. No. 748,948, Aug. 23, 1991, abandoned.

[51] Int. Cl.[5] ............................................. G06K 9/42
[52] U.S. Cl. ...................................... 382/47; 358/451; 358/434; 348/581
[58] Field of Search .................... 382/47, 41, 1, 44; 345/127, 130; 358/451, 534, 535, 536; 348/240, 358, 581

[56] References Cited

U.S. PATENT DOCUMENTS

| | | | |
|---|---|---|---|
| 4,598,283 | 7/1986 | Tung et al. | 340/731 |
| 4,747,154 | 5/1988 | Suzuki et al. | 382/47 |
| 4,907,171 | 3/1990 | Nagashima | 364/518 |
| 4,907,284 | 3/1990 | Ohuchi | 382/47 |
| 5,122,789 | 6/1992 | Ito | 340/731 |

Primary Examiner—David K. Moore
Assistant Examiner—Michael R. Cammarata
Attorney, Agent, or Firm—Allan Jacobson

[57] ABSTRACT

A high speed screening technique is disclosed which can be used to enlarge an image, or when combined with a halftone screen, can be used for high speed screening of stored images. A microcompiler generates customized program code responsive to an input enlargement ratio. The customized program code then performs halftone screening on the input image for the specified desired enlargement ratio. In general, for each different enlargement ratio, a different customized program code is generated. Thus, a parameter of the screening process, the enlargement ratio, which is an input to the microcompiler, is not an input during the run time of the customized program code, thereby permitting the customized program code to run faster since an input parameter has been removed and built into the code itself.

30 Claims, 2 Drawing Sheets

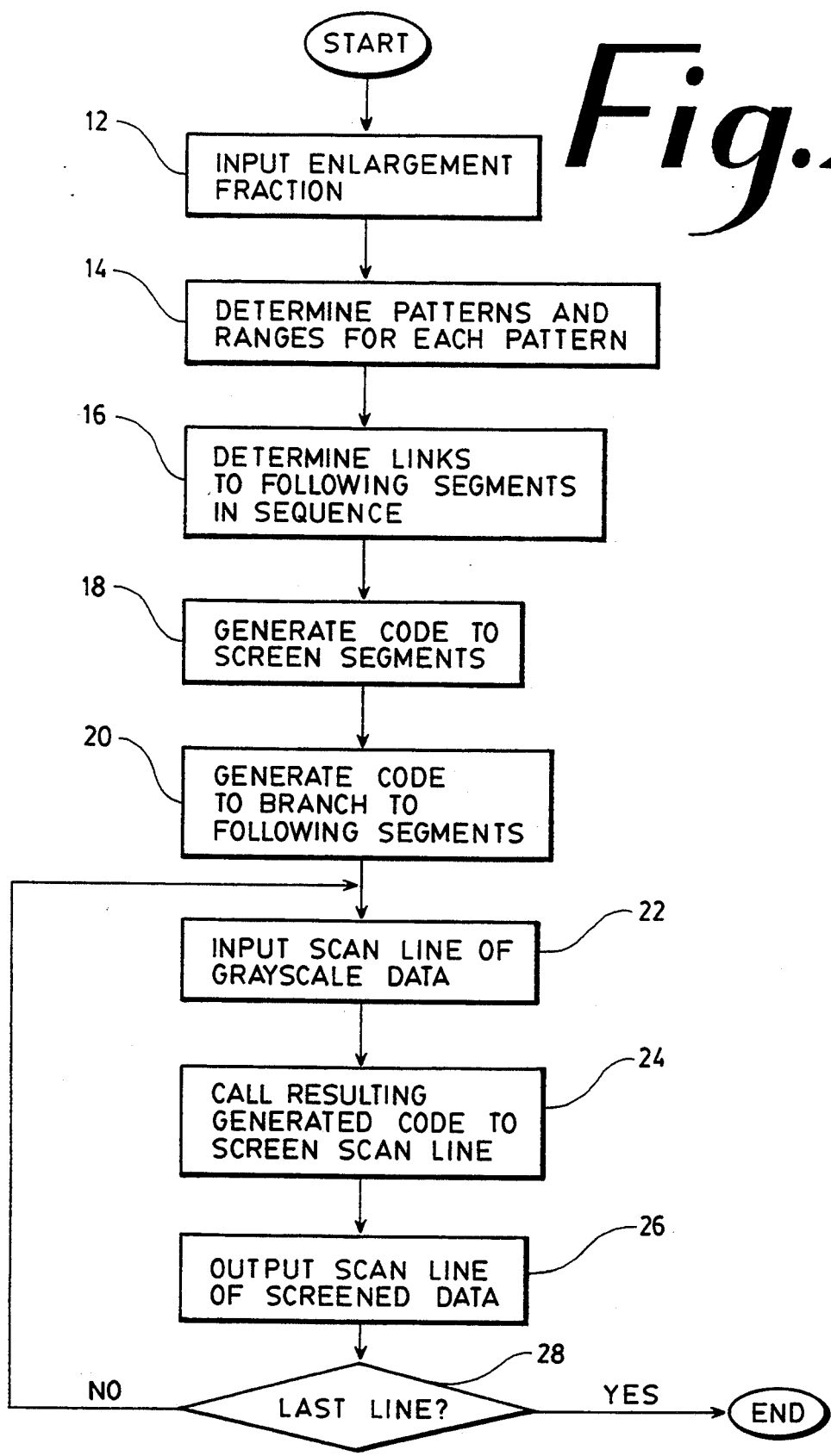

INTEGRATED HALF-TONE SCREENING AND ENLARGING USING AN ENLARGEMENT MAPPING PATTERN HAVING LINKED, UNIQUE PATTERN SEGMENTS

This is a continuation of co-pending application Ser. No. 07/748,948, filed on Aug. 23, 1991, now abandoned.

FIELD OF THE INVENTION

The present invention is related to the halftone screening of images generally, and in particular to the enlargement of stored images useful in the halftone screening of images.

BACKGROUND OF THE INVENTION

Images are typically stored in a memory representing tone values for each pixel of the original image. For a black and white image, the stored pixels represent the gray scale value corresponding to each pixel. For a color image, each color plane is stored as an array of pixels each representing the tone value for each pixel of the image in each respective color plane. For example, if each of the pixels of a black and white image is represented by a 8 bit digital word, then the tone value for a given image pixel may be one of 256 values between the black level and the white level.

Continuous tone images do not print well on most printing devices where typically the absence or presence of the ink on the paper is used to represent the printed image. In order to represent halftones (shades between the presence or absence of the printed ink), the original image is screened to produce a pattern, such a variable size dots which appear to the human eye as a halftone image.

Screening to produce halftone images is well known. The screen consists of an array of dots, or halftone cells, each of which represents one section of continuous tone in the original image as a single dot of variable size and shape. A halftone cell, in turn, consists of an array of smaller screen cells each having individual values against which the input pixels derived from the original image will be compared. The screen is usually stored as a fairly small pattern that repeats itself. If the value of the image pixel is greater than corresponding value of the screen cell, a mark is generated by the marking engine, whereas if the value of the image pixel is less or equal to the screen cell value, then no mark is generated by the marking engine, or vice versa.

In the prior art, techniques for mechanical and electronic screening of images, using a great variety of specific halftone screening patterns, and at various screening angles, are well known to those skilled in the art, In general, the halftone screen is much finer than the original image. That is, in order to represent the halftone by a variable shaped dot of solid color, the halftone cell typically has more screen cells than there are original image pixels. The output device and the screen typically have the same spatial resolution, but the original image usually must be enlarged in size. For example, one scan line on the output device may be 8000 pixels, but only 2000 pixels of the original image were scanned. Therefore, an enlargement ratio of 4 must be used. In general, it is necessary to enlarge the original image by an enlargement factor so that the enlarged image has the same number of pixels as the screen has screen cells. Also, in cases where only a portion of the input image is to be printed, the portion to be printed must be enlarged to fit the screen and final image size. Usually, image enlargement and screening are performed in the same process. The enlargement ratio is almost always greater than one. If the enlargement ratio is less than one, the reduction is performed elsewhere, prior to screening.

To enlarge an image, pixels are repeated. For example, to enlarge an image by a factor of 4, each pixel is repeated 4 times in each of the horizontal and vertical directions. To enlarge an image by a factor of 2.5, each pixel is repeated two times for one half the time, and three times for the other half of the time, in order to average 2.5 times. The enlargement method is typically accomplished by adding a number equal to the reciprocal of the desired enlargement ratio to a register. The previous pixel value is repeated until the register overflows, after which the next pixel is repeated until the register overflows again. Screening (comparing pixels) is performed at the same time as enlargement (repeating pixels). After each register addition of the reciprocal and test for overflow, the resulting input pixel is compared to the appropriate screen cell to generate a screened image.

A key performance measure in screening an image is speed. A fine screen results in a high quality image, but the more cells in the screen, the longer it will take to screen an image. Also, for color separations, four screens, one for each of yellow, magenta, cyan and black are required. Therefore many image screening apparatus typically implement the screening steps in hardware, which generally is faster than a corresponding application of the same methods in software. The present invention makes implementation in software practical and faster than prior art methods.

SUMMARY OF THE INVENTION

A high speed screening technique is embodied in a method and apparatus that can be used to enlarge an image, or when combined with a halftone screen, can be used for high speed screening of stored images. The present invention may be implemented in hardware or software, but, is particularly advantageous for implementation in software.

A method and apparatus of the present invention includes a microcompiler which generates customized program code responsive to an input enlargement ratio. The customized program code then performs halftone screening on the input image for the specified desired enlargement ratio. In general, for each different enlargement ratio, a different customized program code is generated. Thus, a parameter of the screening process, the enlargement ratio, which is an input to the microcompiler, is not an input to the customized program code, thereby permitting the customized program code to run faster since an input parameter has been removed and built into the code itself.

In the present invention, for each different enlargement ratio, the microcompiler recompiles new customized program code to be used for screening the image. However, since each line of the input image is enlarged by the same ratio, the microcompiler need only generate customized program code once for the entire image. That is, the pattern of repeating pixels is the same for each line of the image and for each color separation of the same image. Therefore, for a repetitive process such as halftone screening, the overhead caused by microcompiling is spread out over the number of lines in the image. The time saved in screening greatly outweighs the time lost in microcompiling. By way of comparison, prior art methods implemented in software typically require 10 instructions, or operations per pixel, whereas the present invention uses slightly over 2 instructions per pixel, for a speed improvement of 5 to 1. Specifically, on a 33 MHz computer system using a 486 type Intel microprocessor, the processing speed is about 135 nanoseconds per pixel. The present invention may also be implemented in hardware, resulting in similar improvements in screening speed over prior art hardware techniques.

Furthermore, the present invention may also be used to enlarge and screen the image in the vertical direction. However, in the vertical direction, the decision to repeat or not repeat a previous pixel is made once per line. Therefore, screening speed in the vertical direction is not critical, and prior art techniques may be used.

DESCRIPTION OF THE DRAWING

FIG. 2 is a flow chart of a program embodying the present invention.

DETAILED DESCRIPTION

Figure 1:
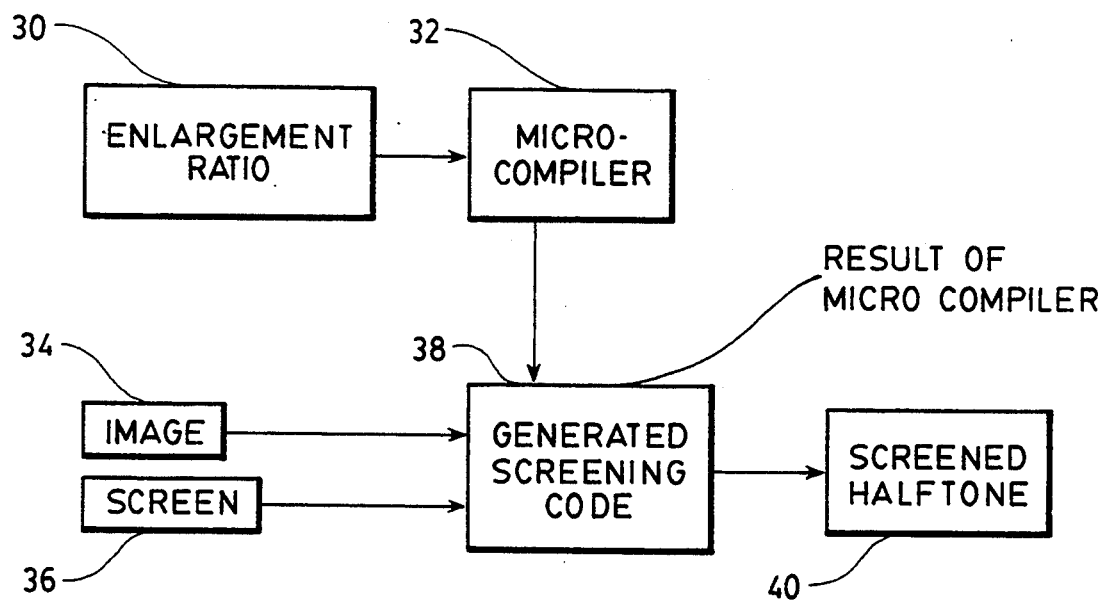
FIG. 1 is a block diagram of a screening apparatus embodying the present invention.

A block diagram of the overall system is shown in FIG. 1. A mircocompiler 32 responsive to an input enlargement ratio 30, generates customized screening code 38. Thereafter, the custom screening code 38 uses an input screen 36 to process an original image 34 and produce a screened halftone output image 40.

The first step in the process of generating customized microcode, shown in FIG. 2, is to input the enlargement fraction at step 12. Then, the overall pattern of repeating pixels which will be used to enlarge each line of the image during screening is computed in step 14. The overall pattern of repeating pixels (which has the same number of bits as there are bits in the final screened image), is identified to have a limited number of smaller patterns, say 16 bits each, which patterns are repeated in some order to form the overall pattern. The inventor has discovered that for any given enlargement ratio, the resulting overall pattern can be described in no more than 17 segments defined by 17 patterns of 16 bits each. As part of the same process in which the 17 patterns are generated, at step 14, the ranges (which implies the order) in which those patterns will be used is determined. The pattern is described as a bit sequence, which is in effect a sequence of control symbols. When a 1 appears in the sequence, a new input pixel is retrieved. When a 0 appears in the sequence, the previous pixel is repeated.

Each of the 17 determined patterns defines a segment of the customized code. Once the ranges and patterns are known, the links between segments are determined at step 16. For each segment, the microcompiler compiles a portion of code. The actual program code corresponding to each segment is generated at step 18, and the branching code based on the determined links between segments is generated at step 20. Thus, with the generated patterns and ranges, and the links between patterns, the overall pattern of repeating pixels during each line of the image will be recreated when the assembled microcode is run.

Thereafter, the original image is screened in steps 22, 24, and 26 until the test for the last line of the image encountered at step 28 indicates the end of the image area. Specifically, each individual line of the original image grayscale data is input at step 22. The segments of resulting code are called in the proper sequence at step 24, and the line of screened scan line data is output at step 26.

Screening a single scan line by prior art methods is expressed in the following pseudocode:

```
f:= 1/e
rem:= 1−f
j:= 0
k:= 0
for i:= 0 to n−1
    rem:= rem + f
    if rem >= 1 then
        g:= input[j]
        j:= j + 1
        rem:= rem − 1
    endif
    if g >= screen[k] then
        m:= 1
    else
        m:= 0
    endif
    result[i]:= m
    k:= k + 1
    if k = p then
        k:= 0
    endif
next
``` where:

e is a real number representing the enlargement ratio, f is the fraction that is the reciprocal of e, rem is a fraction that controls the enlargement, i is an index into the result array, j is an index into the input array, k in an index into the screen array, g is the gray-scale value of the present point in the input, m is the binary value of the present point in the result, n is the number of pixels in the output array, p is the period of the screen array, input[ ] is the gray-scale valued array of input pixels, screen[ ] is the gray-scale valued array of screen pixels, and result[ ] is the binary valued array of resulting pixels.

The above program adds a fraction equal to the reciprocal of the enlargement ratio and tests for overflow. Implemented directly, the algorithm is too slow. It is usual to store f and rem in Q16 format, which is to say that the actual value is 2 −16 * the unsigned value of the 16-bit register. This is possible because both f and rem only take on values between 0 and 1. The result array is nearly always stored in packed form, which is to say that 8 pixels are packed into one byte (or that 16 pixels are packed into one word). This causes a bit of extra complexity in the result[i]:=m step.

In the present invention, the actual code to implement the algorithm is custom made for a given enlargement ratio. The function of the microcompiler program is to generate a second program, the function of which is to implement the screening algorithm for a given constant enlargement ratio. The resulting code is divided into 17 segments that screen 16 output pixels each, simplifying the pixel packing problem mentioned above, as well as dramatically reducing overhead. Each of the segments is equivalent to 16 iterations of the original screening algorithm, and thus each segment generates 16 output pixels. The main loop of the resulting code takes n/16 iterations total, and at each iteration chooses one of the 17 segments to execute. In this way, the total resulting code is fully equivalent to the original algorithm. (It can be assumed without sacrificing generality that n is a multiple of 16).

As indicated above, there are a maximum of 17 possible patterns of 16 bits each which are repeated in some order to form the overall pattern. If the above algorithm is run for 16 iterations, a 16 bit value is generated to form the first pattern. For example, if the enlargement ratio is 4, then, a typical pattern would be 1000100010001000 (in binary notation). A zero means that the previous pixel is to be repeated, while a one means that the next pixel is to be used. The repeating portion of the pattern 1000 means that each pixel will be repeated 4 times.

Given a constant enlargement ratio, the only thing that affects the pattern is the initial value of rem. Rem as a variable is analogous to the phase of a periodic pattern. It can be seen that, for an enlargement ratio of 4, there are four different patterns, corresponding to four different initial values of rem:

| pattern | range |
|---|---|
| 0001000100010001 | 0 <= rem <.25 |
| 0010001000100010 | .25 <= rem <.5 |
| 0100010001000100 | .5 <= rem <.75 |
| 1000100010001000 | .75 <= rem <1 |

In general (for non power-of-two enlargement ratios), there are exactly 17 different patterns, corresponding to 17 ranges of rem. In the code below, there is a subroutine for determining these ranges and patterns for any given enlargement ratio. Enlargement by a factor of 4 is a degenerate case because there are only 4 patterns, and for any initial phase, or value of rem, only one of those patterns is repeated for screening the entire image.

A more general case is illustrated below for an enlargement ratio of 3.1459. The reciprocal of the enlargement ratio is 0.3178. For 16 bits, 0.3178 times 16 is 5.0859. Dropping the integer 5 yields an increase in phase from segment to segment of 0.0859. In hexadecimal, the segment phase increment is 1600. The patterns for the 17 segments, and the ranges of phase (rem) for which each segment is used is given in the table below.

| segment | phase range start | phase range width | pattern | next segment |
|---|---|---|---|---|
| 0 | 0000 | 0BE0 | 1249 | 1,2 |
| 1 | 0BE0 | 0BE0 | 2249 | 2,3 |
| 2 | 17C0 | 0BE0 | 2449 | 3,4 |
| 3 | 23A0 | 0BE0 | 2489 | 4,5 |
| 4 | 2F80 | 0BE0 | 2491 | 5 |
| 5 | 3B60 | 21E0 | 2492 | 5,6,7 |
| 6 | 5D40 | 0BE0 | 4492 | 7,8 |
| 7 | 6920 | 0BE0 | 4892 | 8,9 |
| 8 | 7500 | 0BE0 | 4912 | 9,10 |
| 9 | 80E0 | 0BE0 | 4922 | 10 |
| 10 | 8CC0 | 21E0 | 4924 | 10,11,12 |
| 11 | AEA0 | 0BE0 | 8924 | 12,13 |
| 12 | BA80 | 0BE0 | 9124 | 13,14 |
| 13 | C660 | 0BE0 | 9224 | 14,15 |
| 14 | D240 | 0BE0 | 9244 | 15,16 |
| 15 | DE20 | 0BE0 | 9248 | 16 |
| 16 | EA00 | 1600 | 9249 | 0,1 |

The above table is generated by using conventional means to calculate the overall pattern to enlarge and screen the image. The first column is the segment number, the second and third columns indicate the range of phase (rem) for which the following pattern is to be used, and the last column indicates the links to the next segment, respectively. The 17 patterns are used to generate code segments as illustrated below. The other columns are used to generate program links needed to execute the code segments in the proper order.

For example, assume the initial phase is zero, which means a pattern of 1249 is the initial pattern of enlargement and screening carried out in segment 0. The segment phase increment is added to the initial phase and the next segment of code is located and executed. That is, when phase 11 is entered, the phase lies within the range beginning at AEA0 with a width of 0BE0, i.e. up to BA80. Adding the segment phase increment to a phase value falling in the range between AEA0 and BA80 will result in a new phase which will fall either in segment 12 or 13 depending on the phase when segment 11 is entered. In such manner, the 17 code segments corresponding to the 17 patterns are connected in such manner as to enlarge and screen the original image.

An example of the code that performs the screening is given below. The pattern for the segment is assumed to be 1000100100100100 or 8924 hex, corresponding to segment 11. The language is 8086 assembly, and the grayscale values are 16 bits (two bytes) each. The comments field on the right indicates the bit correspondence to the desired pattern.

```
; --- Register assignment ---
; AX = result word (corresponds to 16 values of m)
; DX = input grayscale (corresponds to g)
; SI = input array of original image (corresponds to input[])
; DI = screen array (corresponds to screen[])
; BP = corresponds to rem (equal to phase and initially zero)
    mov dx,0[si]      ; 1     (1=increment to next pixel)
    cmp dx,0[di]              (0=repeat present pixel)
    adc ax,ax
    cmp dx,2[di]      ; 0
    adc ax,ax
    cmp dx,4[di]      ; 0
    adc ax,ax
    cmp dx,6[di]      ; 0
    adc ax,ax
    mov dx,2[si]      ; 1
    cmp dx,8[di]
    adc ax,ax
    cmp dx,10[di]     ; 0
    adc ax,ax
    cmp dx,12[di]     ; 0
    adc ax,ax
    mov dx,4[si]      ; 1
    cmp dx,14[di]
    adc ax,ax
    cmp dx,16[di]     ; 0
    adc ax,ax
    cmp dx,18[di]     ; 0
    adc ax,ax
    mov dx,6[si]      ; 1
    cmp dx,20[di]
    adc ax,ax
    cmp dx,22[di]     ; 0
    adc ax,ax
    cmp dx,24[di]     ; 0
    adc ax,ax
    mov dx,8[si]      ; 1
    cmp dx,26[di]
    adc ax,ax
    cmp dx,28[di]     ; 0
    adc ax,ax
    cmp dx,30[di]     ; 0
    adc ax,ax
    add si,10         ; 2*    (a total of 5 '1's in pattern)
```

```
add di,32
```

In this code, the "mov dx,0[si]" instructions and the like correspond with "g:=input[j]" in the original algorithm. Similarly, the "cmp dx,0[di]" instructions carry out the "g≧screen[k]" test in the original algorithm, and sets the C (carry) flag of the 8086 microprocessor accordingly. Finally, the "adc ax,ax" instruction simultaneously shifts the ax register one bit to the left, while setting the low order bit equal to the carry flag, permitting the result of the comparisons to be stored in the ax register.

At this point in the code, ax contains 16 result pixels, packed into one word. This word can be output directly to the marking engine, or can be stored in memory for future use. Then, the overall loop count must be checked, so that the main loop runs the correct number of iterations. This is accomplished by a decrement instruction applied to the loop counter, followed by a conditional branch to the termination section of the algorithm.

The repeating screen

This section implements the modulo p addressing of the screen, i.e. the fact that the screen is a repeating pattern.

This modulo p calculation is not done for every pixel, as it is in the prior art algorithm. Rather, it is done for every group of 16 pixels. A consequence of this is that, in the above code, it is possible for the di register (which points to the screen) to go past the screen.

This problem has an easy solution, however: store an additional 15 values from the beginning of the screen after the usual end of the screen. Then, if the di register points past the end of the screen, it still will point to valid screen values.

The overall modulo addressing is implemented with the following code:

```
          cmp  dx, end_of_screen
          jb        screen_ok
          sub  dx, period_of_screen
screen_ok:
``` where end_of_screen is equal to the beginning address of the screen plus 2*p, and period_of_screen is equal to 2*p. Again, the factor of two is due to the fact that each gray-scale value is represented in two bytes.

At this point, it is necessary to determine which segment will handle the next 16 pixels of the screening. The next segment is uniquely determined by the value of rem. Therefore, the first step in determining the next segment is to update the value of rem.

In this example, rem is stored in the bp register, in Q16 form. To update its value, it is necessary to add (16*floor (65536*f)) mod 65536 to bp. For example, if the enlargement ratio is 3.1459, then f is 0.3178, floor (65536*f) is 20832, 16 times this is 333312, and this value mod 65536 is in turn 5682, or 1600 hex. Therefore, the resulting code contains the instruction

```
          add    bp,5682
```

Then, by a sequence of compare and jump instructions, it is possible to determine which segment contains the resulting value of bp.

However, it is not necessary to compare bp among all 17 ranges, because its possible range of values is limited by the range of the present segment.

In this particular example, the segment must have been entered with 44704 (AEA0 hex)≦bp<47744 (BA80 hex). Therefore, at this point, 50386 (C4A0 hex)≦bp<53426 (D080 hex). This means that, in this example, bp may fall only within the ranges of two other segments. In fact, if bp <50784 (C660 hex), then it falls in the first of these segments, and otherwise in the second. This can easily be implemented with the following code:

```
          cmp    bx,50784
          jb         Seg13
          jmp      Seg14
```

And, this ends the example of code for one segment. A program to determine ranges and patterns is given below. The program is written in Microsoft Quick-BASIC, version 4.5

```
DEFLNG A-Z
DIM ph(17), wid(17)    , starting phases and widths
DIM p(17)              , patterns
DIM FirstLink(17), NumLinks(17)
Main:
    INPUT "Enlargement: ", e!
    IF e! = THEN GOTO Main10
    frac = INT(65536 / e!)
    GOSUB FindScreens
    GOSUB ScreenLinks
    GOTO Main
Main10:
    END
FindScreens:
    i = 0
    r = 0
FindScreens1:
    p = 0
    j = 0
    rr = r
    w = 65536 − r
FindScreens2:
    p = p + p
    rr = rr + frac
    IF rr >= 65536 GOTO FindScreens10
    tw = 65536 − rr
    IF w >tw THEN w = tw
    GOTO FindScreens20
FindScreens10:
    p = p + 1
    rr = rr − 65536
FindScreens20:
    j = j + 1
    IF j < 16 GOTO FindScreens2
    ph(i) = r: wid(i) = w: p(i) = p
    r = r + w
    IF r = 65536 THEN r = 0
    i = i + 1
    IF i < 17 GOTO FindScreens1
    RETURN
```

The pattern of ranges has a curious property. For any given enlargement, there are a maximum of three distinct range widths. In addition, the maximum number of segments is 17. The theoretical reasons for these properties are not known, but such properties have been verified experimentally. It should be pointed out that although these programs assume a fixed number of segments (17), the resulting code will function correctly and efficiently even if there are fewer actual segments, for example if the enlargement ratio is a power of two.

The following subroutine determines the links from one segment to the next. For each segment, it is useful to determine which segments are capable of following it in the sequence. This is represented by FirstLink[ ] and NumLinks[ ], which represent the segment number of the first link, and the total number of links, respectively, from the present segment.

Here is a subroutine, also in QuickBASIC, to determine links in this form:

```
ScreenLinks:
    i = 0
    f16 = frac * 16
    WHILE f16 >= 65536
        f16 = f16 - 65536
    WEND
ScreenLinks1:
    nr = ph(i) + f16
    IF nr >= 65536 THEN nr = nr - 65536
    w = wid(i)
    ' find phase starting at nr length w
    j = 0
ScreenLinks10:
    IF ph(j) + wid(j) > nr GOTO ScreenLinks11
    j = j + 1
    GOTO ScreenLinks10
ScreenLinks11:
    FirstLink(i) = j
    nl = 1
ScreenLinks12:
    w = w + nr - ph(j) - wid(j)
    IF w <= 0 GOTO ScreenLinks20
    j = j + i
    nl = nl + 1
    IF j = 17 THEN j = 0
    nr = ph(j)
    GOTO ScreenLinks12
ScreenLinks20:
    NumLinks(i) = nl
    i = i + 1
    IF i < 17 GOTO ScreenLinks1
    RETURN
```

The pattern of links has several curious features, which may be of interest in an implementation. First, if the NumLinks[ ] are summed for each link, the total is 33. This may be useful in determining the code size of the final code. Second, FirstLink[i]+NumLink[i]≦17 for any value of i. This allows the links to be computed and processed without any wrap-around code.

Here is a program, corresponding to block 32 in FIG. 2, written in 8086 assembly language, that compiles the resulting code. It takes as an argument the fraction and returns the final, compiled code. The routines GetEnlargePat and FindEnlargeLinks correspond to the two sections of BASIC code above.

```
EP              struc           ; Enlargement Pattern
EP_StartPh      dw      ?       ; start of range for rem
EP_Width        dw      ?       ; StartPh <= rem < StartPh + Width
EP_Pattern      dw      ?       ; pattern
EP_Start
Next            dw      ?       ; first link to next segment
EP_NumNext      dw      ?       ; number of links to next segment
EP_StartAddr    dw      ?       ; starting address of code for
segment
EP_JumpAddr     dw      ?       ; address of link-jump section
EP_reserved     dw      ?
EP              ends
        public CompileScreen
CompileScreen   proc    far
; Argument: ES:DI= IPP
; Returns: ES:[DI].IPP_ScreenCode set to screening code
        push    es
        push    di
        mov     ax,es:[di].IPP_BXFrac ; 65536 / enlargement ratio
        call    GetEnlargePat
        call    CompileScreenCode
        mov     bp,sp
        lds     si,0[bp]
        mov     word ptr [si].IPP_ScreenCode,di
        mov     word ptr [si].IPP_ScreenCode+2,es
        pop     di
        pop     es
        ret
CompileScreen   endp
GetEnlargePat:
; Argument: AX= fraction (i.e. 65536/enlargement ratio)
; Returns: ES:DI= enlargement pattern
;       AX= 16 * arg AX
        push    ax
        mov     ax,17*size EP
        call    d_TakeRamZ
        mov     cx,17
        mov     dx,0    ; phase
GetEnlargePat1:
        xor     ax,ax   ; pattern
        mov     bx,dx   ; 65536 - width
        push    cx
        push    dx
        mov     cx,16
GetEnlargePat2:
        add     ax,ax
        mov     bp,sp
        add     dx,4[bp]
```

-continued

```
            jc              short GetEnlargePat10
            cmp             bx,dx
            jae             short GetEnlargePat20
            mov             bx,dx
            jmp             short GetEnlargePat20
GetEnlargePat10:
            add             ax,1
GetEnlargePat20:
            loop            GetEnlargePat2
            pop             dx
            pop             cx
            neg             bx
            mov             es:[di].EP_StartPh,dx
            mov             es:[di].EP_Width,bx
            mov             es:[di].EP_Pattern,ax
            add             di,size EP
            add             dx,bx
            loop            GetEnlargePat1
            sub             di,17*size EP
            pop             ax
;           jmp             FindEnlargeLinks
FindEnlargeLinks:
; Arguments: ES:DI= EP with StartPh, Width, and Pattern fields set
;            AX= fraction (i.e. 65536/enlargement ratio)
; Returns: ES:DI= EP with also StartNext and NumNext fields set
;            AX= 16 * arg AX
            shl             ax,4
            mov             cx,17
            push            di
FindEnlargeLinks1:
            mov             dx,es:[di].EP_StartPh
            add             dx,ax
            push            cx
            mov             bp,sp
            mov             bx,2[bp]
            mov             cx,16
FindEnlargeLinks10:
            mov             si,es:[bx].EP_StartPh
            add             si,es:[bx].EP_Width
            cmp             si,dx
            ja              short FindEnlargeLinks11
            add             bx,size EP
            loop            FindEnlargeLinks10
FindEnlargeLinks11:
            push            ax
            mov             ax,bx
            sub             ax,2[bp]
            shr             ax,4
            mov             es:[di].EP_StartNext,ax
            mov             es:[di].EP_NumNext,1
            mov             ax,es:[di].EP_Width
            add             ax,dx
            sub             ax,es:[bx].EP_StartPh
            mov             cx,2[bp]
            add             cx,17*size EP
FindEnlargeLinks12:
            sub             ax,es:[bx].EP_Width
            jbe             short FindEnlargeLinks20
            inc             es:[di].EP_NumNext
            add             bx,size EP
            cmp             bx,cx
            jne             FindEnlargeLinks12
            mov             bx,2[bp]
            jmp             FindEnlargeLinks12
FindEnlargeLinks20:
            pop             ax
            add             di,size EP
            pop             cx
            loop            FindEnlargeLinks
            pop             di
            ret
CompileScreenCode:
; Arguments: ES:DI= EP
;            AX= fraction * 16
; Returns: ES:DI= ScreenCode, suitable for IPP
            push            ax
            push            es
            push            di
            mov             ax,4096
            call            d_TakeRamZ
            push            es
            push            di
```

-continued

```
        add         di,3       ; space for jump instruction
        mov         byte ptr es:[di],0CBh    ; RET FAR
        inc         di
        mov         cx,0
CompileScreenCode1:
        mov         bp,sp
        push        cx
        lds         si,4[bp]
        shl         cx,4       ; again, assumes size EP= 16
        add         si,cx
        mov         ax,8[bp]
        mov         bx,0[bp]
        add         bx,3
        call        CompileScreenSeg
        pop         cx
        inc         cx
        cmp         cx,17
        jne         CompileScreenCode1
        mov         bp,sp
        les         di,0[bp]
        lds         si,4[bp]
        call        LinkEnlargeJumps
        pop         di
        pop         es
        add         sp,6
        ret
CompileScreenSeg:
; Arguments: DS:SI= EP entry
;       ES:DI= where to store code
;       AX= fraction * 16
;       BX= to ret address
        mov         [si].EP_StartAddr,di
        push        ax
        push        bx
        mov         dx,[si].EP_Pattern
        mov         cx,16
        mov         ax,0
        mov         bx,0
CompileScreenSeg1:
        add         dx,dx
        jnc         short CompileScreenSeg4
        and         ax,ax
        jnz         short CompileScreenSeg2
        mov         word ptr es:[di],148Bh    ; MOV DX,[SI]
        add         di,2
        jmp         short CompileScreenSeg3
CompileScreenSeg2:
        mov         word ptr es:[di],548Bh    ; MOV DX,[SI][<ax>]
        mov         byte ptr es:2[di],al
        add         di,3
CompileScreenSeg3:
        add         al,2
CompileScreenSeg4:
        and         bx,bx
        jnz         short CompileScreenSeg5
        mov         word ptr es:[di],153Bh    ; CMP DX,[DI]
        add         di,2
        jmp         short CompileScreenSeg6
CompileScreenSeg5:
        mov         word ptr es:[di],553Bh    ; CMP DX,[DI]<bx>
        mov         byte ptr es:2[di],bl
        add         di,3
CompileScreenSeg6:
        add         bl,2
        mov         word ptr es:[di],0C011h ; ADC AX,AX
        add         di,2
        cmp         bl,20h
        jne         CompileScreenSeg1
        and         al,al
        jz          short CompileScreen10
        mov         word ptr es:[di],0C683h ; ADD SI,<ax>
        mov         byte ptr es:2[di],al
        add         di,3
CompileScreen10:
        mov         word ptr es:[di],0C783h ; ADD DI,20h
        mov         byte ptr es:2[di],20h
        add         di,3
        mov         word ptr es:[di],0BF3Bh ;    C    M    P
DI,[BX].IPP_EmdScreen
        mov         word ptr es:2[di],IPP_EndScreen ;
        add         di,4
        mov         word ptr es:[di],0472h    ; JB 10
```

-continued

```
        add             di,2
        mov             word ptr es:[di],0BF2Bh   ;      S U B
DI,[BX].IPP_ScreenPeriod
        mov             word ptr es:2[di],IPP_ScreenPeriod
        add             di,4
; 10:
        mov             byte ptr es:[di],057h     ; PUSH DI
        add             di,1
        mov             word ptr es:[di],0BF8Bh ; MOV DI,[BX].IPP_OutPtr
        mov             word ptr es:2[di],IPP_OutPtr
        add             di,4
        mov             word ptr es:[di],0C486h ; XCHG AL,AH
        add             di,2
        mov             byte ptr es:[di],0ABh     ; STOSW
        add             di,4
        mov             word ptr es:[di],0BF89h ; MOV [BX].IPP_OutPtr,DI
        mov             word ptr es:2[di],IPP_OutPtr
        add             di,4
        mov             byte ptr es:[di],05Fh     ; POP DI
        add             di,1
        mov             byte ptr es:[di],49h      ; DEC CX
        add             di,1
        pop             bx
        sub             bx,di
        sub             bx,4
        mov             word ptr es:[di],840Fh    ; JZ to_ret
        mov             word ptr es:2[di],bx
        add             di,4
        pop             ax
        mov             word ptr es:[di],0C581h ; ADD BP,<ax>
        mov             word ptr es:2[di],ax
        add             di,4
        mov             [si].EP_JumpAddr,di
        mov             ax,[si].EP_NumNext        leave space for jump
instructions
        shl             ax,3
        sub             ax,5
        add             di,ax
        ret
LinkEnlargeJumps:
; Arguments: ES:DI= code in which to link the jumps
;       DS:SI= EP
        push            ds
        push            si
        push            es
        push            di
        mov             cx,17
LinkEnlargeJumps1:
; {DS:SI points to EP entry of current segment}
mov             bp,sp
        mov             es,2[bp]
        mov             di,[si].EP_JumpAddr
        mov             bx,[si].EP_StartNext
        shl             bx,4    ; assumes size EP= 16
        add             bx,4[bp]
        mov             ax,[si].EP_NumNext
LinkEnlargeJumps2:
        dec             ax
        jz              short LinkEnlargeJumps10
        mov             dx,[bx].EP_StartPh
        add             dx,[bx].EP_Width
        mov             word ptr es:[di],0FD81h ; CMP BP,<dx>
        mov             word ptr es:2[di],dx
        add             di,4
        mov             dx,[bx].EP_StartAddr
        sub             dx,di
        sub             dx,4
        mov             word ptr es:[8 di],0820Fh ; JB <[bx].EP_StartAddr>
        mov             word ptr es:2[di],dx
        add             di,4
        add             bx,size EP      ; assumes no wrap-around
        jmp             LinkEnlargeJumps2
LinkEnlargeJumps10:
        mov             dx,[bx].EP_StartAddr
        sub             dx,di
        sub             dx,3
        mov             byte ptr es:[di],0E9h     ; JMP <[bx].EP_StartAddr>
        mov             word ptr es:1[di],dx
        add             di,3
        add             si,size EP
        loop            LinkEnlargeJumps
        int             3
```

```
            pop                 di
            pop                 es
            pop                 si
            pop                 ds
LinkEnlargeJumps20:
; Find first pattern that begins with a "1"
            cmp                 [si].EP_:Pattern,0
            js                  short LinkEnlargeJumps21
            add                 si,size EP
            jmp                 LinkEnlargeJumps20
LinkEnlargeJumps21:
            mov                 dx,[si].EP_StartAddr
            sub                 dx,di
            sub                 dx,3
            mov                 byte ptr es:[di],0E9h
            mov                 word ptr es:1[di],dx
            ret
```

The same technique can be used on computers other than 8086's, and is equally effective on 68000, 88000, and Sparc type computers. A characteristic of the algorithm is that it is considerably faster on CPU's with fairly large internal caches (say, for example, 8 kilobytes) such as the 80486. The raw screening speed on a 33 MHz 80486 has been measured at 7.5 million pixels per second.

Is noted that the same sequence of segments occurs for every scan line. In an alternate embodiment, it is possible to eliminate the code to test the bp register, and to conditionally branch to the next segment. At the same time it is possible to eliminate the test for the termination of the loop, freeing up the bp and cx registers for alternate use. Each segment is packed as a subroutine, i.e. terminated with a return instruction. Then, the main control loop is a series of call instructions to each segment in turn.

If the number of pixels per line is large, then the above alternative method can lead to unacceptably many call instructions. Specifically, the code may not fit in a cache, causing many more cache misses, which would slow down operation. Therefore, it is best to break the total sequence into macros divided into a hierarchy of subroutines. The main sequencer would call the macros in sequence, and the macros would directly call the segments in sequence. When all of the macros are expanded, the sequence is identical to the original sequence, but uses much less code space. Several well known techniques can be used to choose the macro sequences, such as a variation of the Lev-Zempel-Welch data compression scheme.

What is claimed is:

1. A method for enlarging an image by a preselected enlargement factor, said method comprising:
    storing said image as an array of original pixels;
    compiling a sequence of instructions responsive to said enlargement factor for repeating respective pixels of said stored image, said compiling step comprising:
        generating a sequence of control symbols corresponding to said desired enlargement factor for at least one line of said stored image;
        separating said sequence of control symbols into a plurality of unique patterns corresponding to portions of said sequence of control symbols wherein the sum of the lengths of said plurality of unique patterns is less than the length of said sequence of control symbols;
        compiling a plurality of program segments corresponding to said plurality of unique patterns wherein the sum of the lengths of said plurality of program segments is less than the length of a compiled program corresponding to said sequence of control symbols; and
        determining a plurality of links for connecting said plurality of respective program segments to correspond to said sequence of control symbols; and
    performing said sequence of instructions to process said image.

2. A method for screening an image through a given screen, including enlarging said image by a preselected enlargement factor, said method comprising:
    storing said image as an array of original pixels;
    compiling a sequence of instructions responsive to said enlargement factor for repeating respective pixels of said stored image and for comparing said respective pixels of said enlarged image to said screen, said compiling step comprising;
        generating a sequence of control symbols corresponding to said desired enlargement factor for at least one line of said stored image;
        separating said sequence of control symbols into a plurality of unique patterns corresponding to portions of said sequence of control symbols wherein the sum of the lengths of said plurality of unique patterns is less than the length of said sequence of control symbols;
        compiling a plurality of program segments corresponding to said plurality of unique patterns for screening portions of said stored image by said screen wherein the sum of the lengths of said plurality of program segments is less than the length of a compiled program corresponding to said sequence of control symbols; and
        determining a plurality of links for connecting said plurality of respective program segments to correspond to said sequence of control symbols; and
    performing said sequence of instructions to process said image; whereby said image is enlarged by said preselected enlargement factor and compared to said given screen.

3. A method for improving the speed of execution of a programmed device, wherein said programmed device is responsive to an input parameter to generate a sequence of control symbols to process input data in accordance with said input parameter, the improvement comprising:
    generating said sequence of control symbols corresponding to said input parameter;
    compiling a sequence of instructions in accordance with said sequence of control symbols corresponding to said input parameter prior to processing said input data, said compiling step comprising, separating said sequence of control symbols into a plurality of unique patterns corresponding to portions of said sequence of control symbols wherein the sum of the lengths of said plurality of unique patterns is less than the length of said sequence of control symbols;

compiling a plurality of program segments corresponding to said plurality of unique patterns wherein the sum of the lengths of said plurality of program segments is less than the length of a compiled program corresponding to said sequence of control symbols; and determining a plurality of links for connecting said plurality of respective program segments to correspond to said sequence of control symbols; and processing said input data using said compiled sequence of instructions to process said data.

4. An apparatus for enlarging an image by a preselected enlargement factor, said apparatus comprising:

means for storing said image as an array of original pixels; means for compiling a sequence of instructions responsive to said enlargement ratio factor for repeating respective pixels of said stored image, said compiling means comprising means for generating a sequence of control symbols corresponding to said desired enlargement factor for at least one line of said stored image;

means for separating said sequence of control symbols into a plurality of unique patterns corresponding to portions of said sequence of control symbols wherein the sum of the lengths of said plurality of unique patterns is less than the length of said sequence of control symbols;

means for compiling a plurality of program segments corresponding to said plurality of unique patterns wherein the sum of the lengths of said plurality of program segments is less than the length of a compiled program corresponding to said sequence of control symbols; and means for determining a plurality of links for connecting said plurality of respective program segments to correspond to said sequence of control symbols; and means for performing said sequence of instructions to process said image.

5. An apparatus for screening an image through a given screen, including enlarging said image by a preselected enlargement factor, said apparatus comprising:

storing said image as an array of original pixels;

means for compiling a sequence of instructions responsive to said enlargement factor for repeating respective pixels of said stored image and for comparing said respective pixels of said enlarged image to said screen, said compiling means comprising:

means for generating a sequence of control symbols corresponding to said desired enlargement factor for at least one line of said stored image;

means for separating said sequence of control symbols into a plurality of unique patterns corresponding to portions of said sequence of control symbols wherein the sum of the lengths of said plurality of unique patterns is less than the length of said sequence of control symbols;

means for compiling a plurality of program segments corresponding to said plurality of unique patterns for screening portions of said stored image by said screen wherein the sum of the lengths of said plurality of program segments is less than the length of a compiled program corresponding to said sequence of control symbols; and means for determining a plurality of links for connecting said plurality of respective program segments to correspond to said sequence of control symbols; and means for performing said sequence of instructions to process said image; whereby said image is enlarged by said preselected enlargement factor and compared to said given screen.

6. An apparatus for improving the speed of execution of a programmed device, wherein said programmed device is responsive to an input parameter to generate a sequence of control symbols to process input data in accordance with said input parameter, the improvement comprising:

means for generating said sequence of control symbols corresponding to said input parameter;

means for compiling a sequence of instructions in accordance with said sequence of control symbols corresponding to said input parameter prior to processing said input data, said compiling means comprising:

means for separating said sequence of control symbols into a plurality of unique patterns corresponding to portions of said sequence of control symbols wherein the sum of the lengths of said plurality of unique patterns is less than the length of said sequence of control symbols;

means for compiling a plurality of program segments corresponding to said plurality of unique patterns wherein the sum of the lengths of said plurality of program segments is less than the length of a compiled program corresponding to said sequence of control symbols; and means for determining a plurality of links for connecting said plurality of respective program segments to correspond to said sequence of control symbols; and means for processing said input data using said compiled sequence of instructions to process said data.

7. A method for screening an image from an input register dx in a central processor, through a given screen, including enlarging said image by a preselected enlargement factor, to an output register ax in said central processor, said method comprising:

storing said image as an array of original image pixels;

generating a sequence of binary control symbols corresponding to said desired enlargement factor for at least one line of said stored image;

compiling a sequence of instructions responsive to said binary control sequence for comparing a respective pixel of said image to said screen and for repeating said comparison of said respective pixel of said image to said screen, wherein said compiled instructions comprise:

```
mov  dx
cmp  dx
adc  sax,ax
``` for each said binary control symbol equal to a first binary value, and wherein said compiled instructions comprise:

```
cmp  dx
adc  ax,ax
``` for each said binary control symbol equal to a second binary value, wherein said mov dx instruction substantially corresponds to moving one pixel of the original image into said central processor, said cmp dx instruction substantially corresponds to comparing the original image pixel to the screen pixel and the adc ax, ax instruction substantially corresponds to storing the result of the preceding comparison in a register, ax; and performing said compiled sequence of instructions to process said original image, whereby said image is compared to said given screen and enlarged by said preselected enlargement factor.

8. A method in accordance with claim 7, wherein said step of compiling a sequence of instructions responsive to said binary control sequence further comprises:

separating said sequence of binary control symbols into a plurality of unique patterns corresponding to portions of said sequence of binary control symbols;

compiling a plurality of program segments corresponding to said plurality of unique patterns for screening portions of said stored image by said screen; and determining a plurality of program calls for connecting said plurality of respective program segments to correspond to said sequence of control symbols.

9. An apparatus for screening an image from an input register dx in a central processor, through a given screen, including enlarging said image by a preselected enlargement factor, to an output register ax in said central processor, said apparatus comprising:

means for storing said image as an array of original image pixels;

means for generating a sequence of binary control symbols corresponding to said desired enlargement factor for at least one line of said stored image;

means for compiling a sequence of instructions responsive to said binary control sequence for comparing a respective pixel of said image to said screen and for repeating said comparison of said respective pixel of said image to said screen, wherein said compiled instructions comprise:

```
mov  dx
cmp  dx
adc  ax,ax
``` for each said binary control symbol equal to a first binary value, and wherein said compiled instructions comprise:

```
cmp  dx
adc  ax,ax
``` for each said binary control symbol equal to a second binary value, wherein said mov dx instruction substantially corresponds to moving one pixel of the original image into said central processor, said cmp dx instruction substantially corresponds to comparing the original image pixel to the screen pixel and the adc ax,ax instruction substantially corresponds to storing the result of the preceding comparison in a register, ax; and means for performing said compiled sequence of instructions to process said original image, whereby said image is compared to said given screen and enlarged by said preselected enlargement factor.

10. An apparatus in accordance with claim 9, wherein said means for compiling a sequence of instructions responsive to said binary control sequence further comprises:

means for separating said sequence of binary control symbols into a plurality of unique patterns corresponding to portions of said sequence of binary control symbols;

means for compiling a plurality of program segments corresponding to said plurality of unique patterns for screening portions of said stored image by said screen; and means for determining a plurality of program calls for connecting said plurality of respective program segments to correspond to said sequence of control symbols.

11. A method in accordance with claim 1, wherein said step of separating said sequence of control symbols into a plurality of unique patterns corresponding to portions of said sequence of control symbols, comprises separating said sequence of control signals into no more than n+1 patterns of n bits each, wherein n is a multiple of 16 bits.

12. A method in accordance with claim 11, wherein said step of compiling a plurality of program segments corresponding to said plurality of unique patterns, comprises compiling no more than n+1 program segments corresponding to said n+1 patterns.

13. A method in accordance with claim 12, for which n equals 16 bits, and for which there are 17 program segments, wherein said step of determining said plurality of links for connecting said 17 program segments comprises determining a maximum of 3 links for each of said 17 program segments linking each said program segment to one of 3 program segments of said 17 program segments.

14. An apparatus in accordance with claim 4, wherein said means for separating said sequence of control symbols into a plurality of unique patterns corresponding to portions of said sequence of control symbols, comprises means for separating said sequence of control signals into no more than n+1 patterns of n bits each, wherein n is a multiple of 16 bits.

15. An apparatus in accordance with claim 14, wherein said means for compiling a plurality of program segments corresponding to said plurality of unique patterns, means for comprises compiling no more than n+1 program segments corresponding to said n+1 patterns.

16. An apparatus in accordance with claim 15, for which n equals 16 bits, and for which there are 17 program segments, wherein said means for determining said plurality of links for connecting said 17 program segments comprises means for determining a maximum of 3 links for each of said 17 program segments, and means for linking each said program segment to one of 3 program segments of said 17 program segments.

17. A method in accordance with claim 2, wherein said step of separating said sequence of control symbols into a plurality of unique patterns corresponding to portions of said sequence of control symbols, comprises separating said sequence of control signals into no more than n+1 patterns of n bits each, wherein n is a multiple of 16 bits.

18. A method in accordance with claim 17, wherein said step of compiling a plurality of program segments corresponding to said plurality of unique patterns, comprises compiling no more than n+1 program segments corresponding to said n+1 patterns.

19. A method in accordance with claim 18, for which n equals 16 bits, and for which there are 17 program segments, wherein said step of determining said plurality of links for connecting said 17 program segments comprises determining a maximum of 3 links for each of said 17 program segments linking each said program segment to one of 3 program segments of said 17 program segments.

20. An apparatus in accordance with claim 5, wherein said means for separating said sequence of control symbols into a plurality of unique patterns corresponding to portions of said sequence of control symbols, comprises means for separating said sequence of control signals into no more than n+1 patterns of n bits each, wherein n is a multiple of 16 bits.

21. An apparatus in accordance with claim 20, wherein said means for compiling a plurality of program segments corresponding to said plurality of unique patterns, means for comprises compiling no more than n+1 program segments corresponding to said n+1 patterns.

22. An apparatus in accordance with claim 21, for which n equals 16 bits, and for which there are 17 program segments, wherein said means for determining said plurality of links for connecting said 17 program segments comprises means for determining a maximum of 3 links for each of said 17 program segments, and means for linking each said program segment to one of 3 program segments of said 17 program segments.

23. A method in accordance with claim 3, wherein said step of separating said sequence of control symbols into a plurality of unique patterns corresponding to portions of said sequence of control symbols, comprises separating said sequence of control signals into no more than n+1 patterns of n bits each, wherein n is a multiple of 16 bits.

24. A method in accordance with claim 23, wherein said step of compiling a plurality of program segments corresponding to said plurality of unique patterns, comprises compiling no more than n+1 program segments corresponding to said n+1 patterns.

25. A method in accordance with claim 24, for which n equals 16 bits, and for which there are 17 program segments, wherein said step of determining said plurality of links for connecting said 17 program segments comprises determining a maximum of 3 links for each of said 17 program segments linking each said program segment to one of 3 program segments of said 17 program segments.

26. An apparatus in accordance with claim 6, wherein said means for separating said sequence of control symbols into a plurality of unique patterns corresponding to portions of said sequence of control symbols, comprises means for separating said sequence of control signals into no more than n+1 patterns of n bits each, wherein n is a multiple of 16 bits.

27. An apparatus in accordance with claim 26, wherein said means for compiling a plurality of program segments corresponding to said plurality of unique patterns, means for comprises compiling no more than n+1 program segments corresponding to said n+1 patterns.

28. An apparatus in accordance with claim 27, for which n equals 16 bits, and for which there are 17 program segments, wherein said means for determining said plurality of links for connecting said 17 program segments comprises means for determining a maximum of 3 links for each of said 17 program segments, and means for linking each said program segment to one of 3 program segments of said 17 program segments.

29. A method for screening an image through a given screen, including enlarging said image by a preselected enlargement factor, said method comprising:
storing said image as an array of image pixels;
generating a sequence of binary control symbols corresponding to said desired enlargement factor for at least one line of said stored image;
compiling a sequence of instructions responsive to said binary control sequence for comparing a respective pixel of said image to said screen for each said binary control symbol equal to a first binary value, and for repeating said comparison of said respective pixel of said image to said screen, for each said binary control symbol equal to a second binary value; and
performing said compiled sequence of instructions to process said original image, whereby said image is compared to said given screen and enlarged by said preselected enlargement factor.

30. An apparatus for screening an image through a given screen, including enlarging said image by a preselected enlargement factor, said apparatus comprising:
means for storing said image as an array of image pixels;
means for generating a sequence of binary control symbols corresponding to said desired enlargement factor for at least one line of said stored image;
means for compiling a sequence of instructions responsive to said binary control sequence for comparing a respective pixel of said image to said screen for each said binary control symbol equal to a first binary value, and for repeating said comparison of said respective pixel of said image to said screen, for each said binary control symbol equal to a second binary value; and
means for performing said compiled sequence of instructions to process said original image, whereby said image is compared to said given screen and enlarged by said preselected enlargement factor.

* * * * *